2 Sheets--Sheet 1.

L. H. FARNSWORTH.

Manufacture of Boots and Shoes.

No. 4,933. Reissued June 4, 1872.

*Witnesses:*

Henry N. Miller

C. L. Evert.

L. H. Farnsworth

Assignee of Enos Alexander per Alexander & Mason

*Attorneys.*

2 Sheets--Sheet 2.
L. H. FARNSWORTH.
Manufacture of Boots and Shoes.
No. 4,933. Reissued June 4, 1872.
Fig. 6.
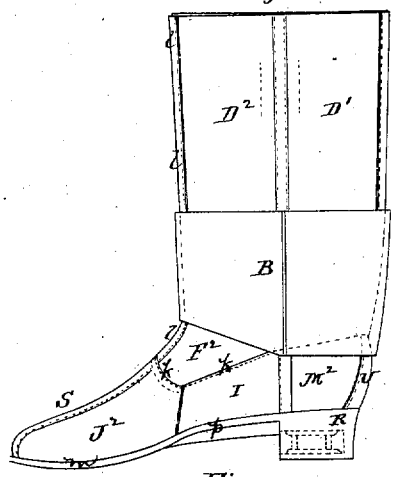
Fig. 14.
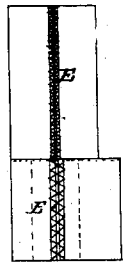
Fig. 7.
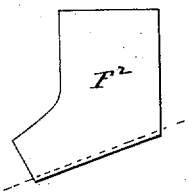
Fig. 8.
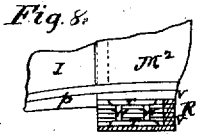
Fig. 9.
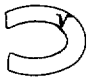
Fig. 10.
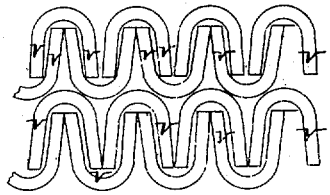
Fig. 12.
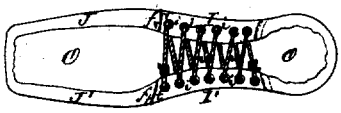
Fig. 11.
Fig. 13.
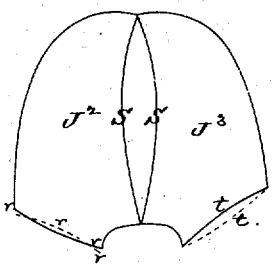
Fig. 15.
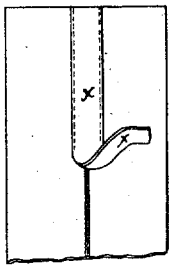
Witnesses:
Henry N. Miller
C. L. Evers
L. H. Farnsworth
Assignee of Elias Alexander
per Alexander Mason
Attorneys.

UNITED STATES PATENT OFFICE.

LUTHER H. FARNSWORTH, OF HUDSON, MASSACHUSETTS, ASSIGNEE OF PHEBE S. ALEXANDER, ADMINISTRATRIX OF THE ESTATE OF ELIAS ALEXANDER, DECEASED.

IMPROVEMENT IN THE MANUFACTURE OF BOOTS AND SHOES.

Specification forming part of Letters Patent No. 39,370, dated August 4, 1863; reissue No. 4,933, dated June 4, 1872.

*To all whom it may concern:*

Be it known that ELIAS ALEXANDER, of Providence, in the county of Providence and State of Rhode Island, did invent a new and useful Improvement in the Manufacture of Boots and Shoes; and I do hereby declare that the following is a full, clear, and exact description of the same, reference being had to the accompanying drawing making part of this specification, in which—

Figure 1:
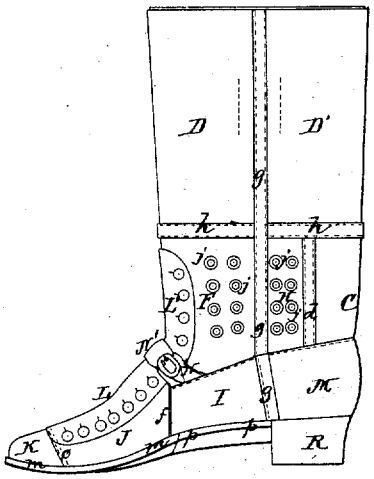
Figure 3:
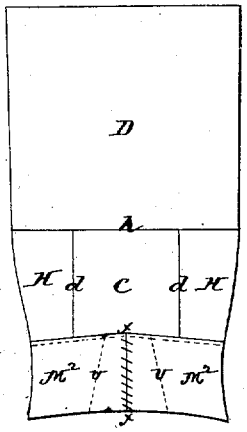
Figure 2:
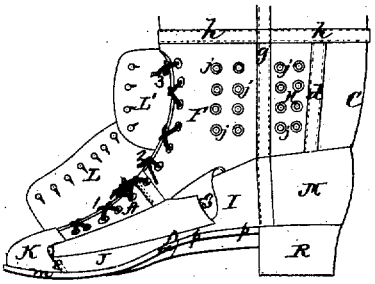
Figure 4:
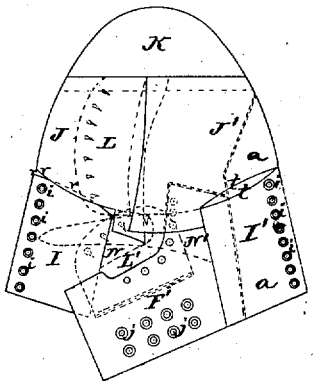
Figure 5:
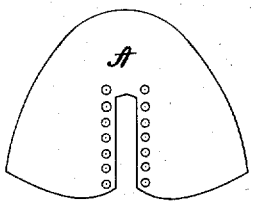

Figure 1 represents one construction of the improved boot—an open-top boot. Fig. 2 is a similar view of the same with the lapels L L′ folded back, showing the arrangement of the "front" beneath the same. Fig. 3 is a diagram of the pieces composing the back of such boot. Fig. 4 is a diagram of the pieces composing the front of the same. Fig. 5 is a diagram of the cloth lining A of the front, Fig. 2. Fig. 6 represents another construction of the improved boot (a closed-top boot) with a slip-leg, B, which is in a separate piece, and is intended to be worn with either construction. Fig. 7 is a diagram of the ankle-piece F of the front of such boot. Fig. 8 is a transverse section of the improved heel for boots and shoes. Fig. 9 is a plan of one of the "lifts" of such heel. Fig. 10 is a diagram, illustrating the method proposed of cutting such "lifts" from the hide with economy. Fig. 11 is a diagram of a straight piece of leather, which may be converted into such "lifts" by bending. Fig. 12 represents the boot "upper" upon the "last," showing the improved method of staying the same over the shank. Fig. 13 is a diagram of the pieces composing the vamp of the closed-top boot, Fig. 6. Fig. 14 shows the mode of making a seam by first connecting two edges of the leather and "whipping" the thread back and forth across the two parts before sewing thereon the outer shielding strip; and Fig. 15 shows two pieces of leather placed edge to edge with the outer strip sewed thereon.

Similar letters of reference indicate corresponding parts in all the figures.

In the manufacture of boots it has heretofore been the practice to form the front and back of the same, each in one piece, which are united by a seam, *g*, on each side, or to form each in two pieces, which are united by a seam, *h*. In cutting such pieces of the proper size and form a large percentage of the skin is necessarily wasted, the remaining pieces being of such size and form as to be comparatively worthless to the manufacturer; and, in order to cut the skin advantageously, it not unfrequently happens that the more durable portions of the skin go to form the leg and instep of the boot, where it is subjected to but little strain and wear, while the thinner and less durable portions thereof go to form the toe and vamp, where it is subjected to the severest strain and wear, in consequence of which this latter portion of the boot soon breaks or wears out, often before the sole is worn through, and the boot is thus rendered useless, except for footing. By the present method, also, if the boot breaks out at the side, or any part of the upper leather wears through, it can only be repaired by patching, which is both weak and unsightly. Again, when the vamp and toe of the boot become so worn and broken that the boot is worthless, except for footing, in most cases the leg and instep of the upper leather are as good and useful as ever. The heel is good and the shank is in perfect form and firmly secured to the upper leather, notwithstanding which the instep, the shank, and the heel are all cut away and lost in order that the simple leg may be again made serviceable by footing; and if the back of the leg at C is worn to a hole, or even thin, (and it is at this point that the leg first wears out,) the entire boot is rejected as worthless for any purpose whatsoever. Also, in the present method of making the seams the two pieces to be united are laid side by side and sewed together as near the edge as possible; then the seam is pressed down. This, however, always leaves more or less of a ridge on the inside, which is very annoying, as it often chafes and injures the wearer.

To provide a remedy for these and other objections in the present method of making boots and shoes is the object of this invention, which consists in making the front and back of boots each in a number of pieces, and in such a formation and arrangement of such pieces that those portions of the boot which—from being subjected to the severest strain and wear—are the soonest worn out may be removed and replaced with new leather without disturbing the other parts of the same, substantially as hereinafter specified. The invention further consists in easing and ventilating the foot and ankle of a boot by means of an opening extending along the top of the foot from the toe to the upper part of the ankle, which is drawn together and adjusted by two or more lacings, and is covered to exclude rain, snow, and dirt; and by perforating that portion of the leg which surrounds the ankle, as hereinafter specified, and, in combination with the said covered laced opening, the use of a strap and buckle across the instep of such boot, for the purpose of holding the foot firmly therein and preventing it from crowding forward against the toe. The invention also consists in the peculiar construction of the heel of boots and shoes to effect a saving in leather as compared with the ordinary method of making leather heels, substantially as hereinafter specified. It also consists in uniting two pieces of leather for a boot or shoe by placing their edges together and sewing a strip on the outside to both pieces, covering the joint; and, also, in making a seam, after placing the edges of the leather together, by "whipping" the thread across the two parts back and forth before the outer shielding-strip is sewed on.

To enable others skilled in the art to make and use my invention I will proceed to describe the same.

In the annexed drawing, Figure 1 represents an "open-top" boot, it being made to open along the top of the foot and ankle, as shown in Fig. 2; and Fig. 6 represents a "closed-top" boot, the front being closed over the foot and ankle—the former being a ventilated boot designed for warm weather, and the latter being intended for general use and wet weather. The front of the open-top boot, besides the leg piece D, Figs. 1 and 2, may be composed of the following pieces, shown in Fig. 4, viz., two ankle pieces, F $F^1$; two shank pieces, I $I'$; two side pieces or vamp pieces, J $J^1$; and the toe piece, K; with the following pieces, being coverings and fastenings, shown in single dotted lines: the lapels L $L'$, and the straps N $N'$; and the lining pieces, viz., the side-foot lining *a*, shown in double dotted lines, Fig. 4, and the front-lining A, shown in Fig. 5. These pieces are formed and arranged substantially as shown in the several figures. The back of the boot may be composed of the leg pieces $D^1$, the two ankle pieces H H, the back ankle piece C, and the counter M. These are formed and arranged as shown in Figs. 1, 2, and 3, and are united to the front above described by the side seams *g g*, as shown in Figs. 1, 2, and 6.

It is evident that in forming a boot in such a number of pieces not only may the skin be cut more economically, but the thicker and more durable portions may be selected to form such parts of the boot as are subjected to the severest wear, viz., the vamp J $J^1$, the toe K, and the ankle piece C, while the less durable portions thereof may be cut into ankle and leg pieces, which are but little affected by wear; also that a better grade of leather may be worked into the foot of the boot, while an inferior grade may go to form such parts as are but little exposed to wear and sight, thereby considerably cheapening the cost of the boot without diminishing its usefulness or durability. The parts of the boot which wear out the soonest are the toe K and vamp J of the foot, and the back of the ankle at C, Figs. 1 and 3; and in order that these parts may be removed when worn and replaced with new leather each of said parts is formed in a separate piece and united to the less perishable parts by seams so located and arranged that the former pieces may be removed without disturbing the latter. To accomplish this purpose the seam *f* is made, which seam is shown in Figs. 1, 2, and 6, and extends from the junction of the tap *m* with the shank *p* of the sole upward and backward toward the ankle, as shown, uniting the vamp J with the shank piece L, whereby the tap *m* and vamp J may be removed and replaced without disturbing the shank *p* and the shank pieces I I. In replacing the toe piece K it is only necessary to lift up the foremost part of the tap as far as the seam *e*. The seam *f*, located as shown and described, has an important bearing upon the manufacturing and repairing of boots and shoes, for by means of this seam the vamp J and the toe piece forward of the same may be removed from time to time as long as the more durable instep, heel, and shank remain serviceable, which are thereby saved and made useful instead of being cut away, as heretofore, in footing a boot, or thrown away as useless in a shoe; also, instead of patching the vamp J, as formerly practiced, the broken or worn piece J or $J^1$, or the toe piece K, may be renewed with the same facility that a patch can be put on in the manner above described. This seam *f*, therefore, for the specified purpose, forms one feature of improvement in this invention. The seams *d d* in the back of the boot, in connection with the seam *h*, are also of great importance, for by means of the said seams the ankle piece C may be renewed from time to time as long as the leg and counter remain firm and sound, thereby giving increased strength and durability to the leg of the boot when and where it is most needed. The ankle pieces H H may also be renewed from time to time with equal facility by means of the said seams. It is obvious from the above description that the removable piece C may include the two pieces H H—that is, be formed in one piece terminating in the side seams *g g*—and the same desirable result obtained. The seams *d d* in combination with the removable piece C form another feature of improvement in this invention. The seams *g* and *d d* are formed by stitching a "welt" or narrow strip, *x*, of leather, to the two pieces thus united with their edges together. The advantage of this form of seam in this connection is, that it gives additional strength to the parts thus united; it receives the wear which would otherwise come upon the leg; and, as it is closed from the outside contrary to the usual form of side seam used, it provides for the removal and replacement of the pieces. This form of seam will also prevent the formation of any ridge on the inside, and for this reason may be used upon any part of a boot or shoe, and forms a very important feature of this invention. Before sewing on the strip *x* the two parts may be sewed together, as shown in Fig. 14, by being sown through from and "whipped" over upon the outside. It has been above stated, and it will be seen by reference to Fig. 2, that the opening in the front of the boot extends from the toe piece K to the upper part of the ankle piece F; that the edges of said opening are drawn together to adjust the boot to the proper degree of snugness by means of two or more separate sets of lacings, 1, 2, and 3; and it is the particular location and extent of the opening and the use of two or more distinct lacings as specified which distinguish my arrangement from that of openings heretofore employed in the front of boots and gaiters; and the use of a single lacing therewith for the sake of mere ornament or for the purpose of admitting the foot and fastening the gaiter-boot thereon—the ordinary construction of a laced opening with but a single lacing being insufficient for the accomplishment of the purpose intended in the arrangement shown and described. By means of the aforesaid laced opening the entire foot is thoroughly ventilated, and the parts connected by the several lacings may be separately adjusted to favor a more sensitive part of the foot, or to ease the boot when the foot becomes swollen from long-continued walking or standing.

In applying this improvement to shoes it will only be necessary to use the lacing 1 across the toes and ball of the foot, as the laced opening which constitutes the fastening will furnish sufficient means of ventilation and relief to the foot. It should be here stated, by way of explanation, that the several sets of lacings are to be adjusted when the boot or shoe is first put on, and that they are not afterward to be disturbed in pulling the boot or shoe on and off.

In combination with a laced opening, as above described, it is necessary to use a lapel or covering, L L′, to exclude rain, snow, and dirt; and as the instep of a boot is divided by the said opening a strap and buckle, N N, is required to hold the foot from shoving forward and breaking through the toe of the boot; and though both the lapels and the strap and buckle are old and well known, yet when combined with the said laced opening each is considered as forming a part of such combination and improvement, and are consequently therewith claimed.

The leg of the boot is ventilated at the ankle by means of a number of perforations or openings, *j j*, made directly through the leg of the boot, as shown in Figs. 1 and 2, in which perforations eyelets may be inserted, if desired. The front foot-lining A, Figs. 2 and 5, may be of either cloth or leather, the former being preferred for a cool ventilated boot; and, when additional warmth is required in boots of this construction, the purpose is to insert a layer of padding, or woolen cloth, or other suitable material, between the foot-lining A and the lapel L, which covers the same.

The closed-top boot, Fig. 6, is intended for general use and for wet weather; and, though its construction is mainly like that of the open-top boot, it contains some important points of difference which are improvements in closed-top boots of the ordinary construction. The parts or pieces which are common in both are indicated by the same letters of reference.

It will be seen that the vamp J is formed in two pieces, $J^2$ and $J^3$, a diagram of which is shown in Fig. 13; and it will be seen that there is a continuous seam, *l*, extending from the top of the leg to the toe, in the front of the boot, which divides the upper part of the leg into two equal pieces, $D^2$, the ankle into two equal pieces, $F^2$, and the vamp and toe into two equal pieces, $J^2$ and $J^3$, (see Fig. 13.)

The advantages of this continuous seam *l* are, that the leather may be cut with greater economy by making each part of the front—viz., $D^2 F^2$ and $J^2 J^3$—in two pieces instead of a single piece; that in forming the ankle in two pieces, as represented in Fig. 7, and uniting the same by the seam *l*, the operation of crimping the front to form the bend of the ankle is avoided, and a more natural and easy shape is given to this portion of the boot, without a tendency to wrinkle. By means of this separate crimped ankle piece a more pliable piece of leather may be inserted in the ankle of thick boots, and by so doing overcoming the stiffness and consequent liability to chafe the ankle, so universally experienced in wearing such boots. By forming the vamp J in two pieces, united by a seam, *l*, the maker is enabled, by cutting the edges S $S^1$, Fig. 13, which are united in said seam, with a suitable curvature, to remove the surplus of leather which goes to form wrinkles over the ball of the foot, and to make this portion of a boot or shoe conform more nearly to the shape of the foot without wrinkling.

The seam *f*, which has been more particularly described above, has the same advantages in the closed-top as in the open-top boot; and, in addition to those hereinbefore specified, there is one other of considerable importance, viz., near the ball of the great toe, upon the inside of the foot of the boot, there is—owing to the hollowing in of the foot at this point—a surplus of leather, and upon the opposite side of the foot there is a corresponding roundness or fullness. To make the boot conform more nearly to the shape of the foot at these two points the two edges *t t* are cut, which are united in the seam *f* upon the inside of the foot, in the form shown in Figs. 4 and 13, to remove the surplus leather; and two edges, *r r*, are also cut upon the outside of the foot, in the form shown in the said figures, to create a fullness at this point.

In Fig. 6 of the drawing, B is a slip-leg or covering, for protecting the ankle from cold and dampness, for which purpose, especially in traveling, it is exceedingly useful. It consists of a sleeve of leather, lined with woolen, fur, or a similar material, or of thick woolen cloth or canvas, of the proper size and form to slip smoothly over the boot-leg and fit easily around the ankle of the same. It is easily put on and off, and when not in use it may be folded into a small package and carried, without inconvenience, in the pocket.

In renewing the toe and vamp of the boot or shoe a number of times, using the same shank *p*, it is necessary that the shank piece I be secured as firmly as possible to the said shank. To effect this purpose eyelets *i i* are inserted in the closing edges of the two shank pieces I I′, as shown in Fig. 4; and by means of a stout waxed lacing or thong, *u*, passing through the said eyelets, the two edges are laced snugly over the inner sole O in the operation of "lasting" the boot or shoe, and secure the ends in a knot, as shown in Fig. 12, which connects the two edges securely by a direct pull across the shank, and thereby sustains and relieves the stitching or pegging upon each side of the shank from the severe strain to which the same would otherwise be subjected. This lacing also greatly facilitates the operation of lasting, besides drawing the upper leather down over the shank more evenly than it can possibly be done by pincers in the ordinary way.

An improved method of constructing the heel of boots and shoes is shown in Fig. 8, which consists in forming a heel of a number of horseshoe-shaped lifts of leather, V V, Fig. 9, and a top lift covering the hollow space inclosed by the previous lifts V V. Within this hollow space there may be arranged a suitable support, consisting of two metal plates, T T, united by two posts, W W, or a flat piece of wood placed directly beneath the top lift and its edges resting upon one of the under lifts, or a block of wood occupying the entire hollow space, either being sufficient for the purpose. An interior support is, however, entirely unnecessary, as the top lift will be sufficiently supported if the horseshoe-shaped lifts V be of a proper width —say half an inch. The open space in front of the heel may be closed with pieces of leather pegged to the sole and to each other. In this way heels may be constructed not only of sole-leather, but of lifts of upper-leather, in every way as substantial and durable as a heel made in the ordinary way, and with a saving of from eighty to one hundred per cent. in material as compared with the ordinary method. As this heel is made entirely of leather, and is built upon the sole in the usual way with the same tools usually employed, it can be readily made by any boot or shoe maker.

The horseshoe-shaped lifts V, Fig. 9, may be cut from the leather in the manner shown by the diagram, Fig. 10, with but little waste of stock, while the leather which, in the ordinary construction, forms the interior of the heel, is, by this method of cutting, converted into a portion of the outside—viz., the ends of the lifts V—which results in a saving of eighty per cent. in material—that is, eighty per cent. more lifts of the horseshoe form may be cut from the same piece of leather than of the ordinary form. The horseshoe-shaped lifts V may be made with still greater economy from strips like that shown in Fig. 11, which may be cut from the hide without any waste, and which may be cut from scraps of both sole and upper leather, which are now thrown away as being too small for any purpose. These strips may be readily curved into the form required for the lifts V separately, with the fingers, as they are wanted, and, by means of a very simple machine, a number may be curved into the proper form at one operation.

It will be seen that the outside counter M, Fig. 3, is formed in two pieces, $M^2$ $M^2$, which are united in a seam at *x′ x′*, over which is stitched a stiffener or patch, U, as shown fully in Fig. 6, and by dotted lines in Fig. 3, for the twofold purpose of concealing the seam *x′* and stiffening the counter.

By forming the counter in two pieces instead of a single piece a considerable saving in stock is effected, as, the counter being the smallest piece in the whole boot, it often happens that a piece, otherwise of sufficient size and every way suitable for a counter, lacks a corner or is a trifle too short. Such pieces, though worthless for whole counters, may be converted into half-counters and stiffeners, resulting in a saving of such pieces and their substitution for counters cut direct from the skin.

Forming the outside counter of boots in two or more pieces forms another feature of improvement in this invention.

In the closed-top boot represented in Fig. 6 it will be seen that the foot of the boot is united with its leg by means of the seam *k* extending from one side seam, *g*, directly across the instep to the opposite side seam *g*, and that, in connection with such seam, a separate crimped ankle piece, F, Fig. 7, formed in two pieces, united by a single straight seam, *l*, in front—or its equivalent, a single piece crimped in the usual way—is employed to carry into effect the several purposes to be accomplished in forming the front of the boot in a number of pieces, substantially as herein specified.

It will be understood that this invention is not intended to be confined to the exact number of forms of the pieces, nor to the precise location of the seams as herein set forth; but to embrace all merely formal variations therefrom, by means of which those parts of a boot or shoe which are the soonest worn or broken may be removed and replaced with new leather without disturbing the other parts of the same; that the more durable portions of the skin may go to form those parts of the boot or shoe which are subjected to the severest wear; and that greater economy may be exercised in cutting the leather than by the ordinary method, substantially as herein specified.

Having thus fully described the invention, what is claimed as new, and desired to be secured by Letters Patent, is—

1. The seam for boots and shoes formed by placing two pieces of leather edge to edge, and connecting the same by sewing the strip *x* on the exterior of both pieces, substantially as and for the purposes herein set forth.

2. The seam for boots and shoes formed by placing two pieces of leather edge to edge, sewing the parts thus placed by a "whip-stitch," and then covering the joint by the outer strip *x* sewed on the two parts and over the connecting-stitches, substantially as and for the purposes herein set forth.

3. The front and back of boots and shoes, when each is formed in a number of pieces, constructed and arranged substantially as herein described to effect the purpose specified.

4. The two side seams *f f*, in combination with a removable piece or pieces forming the vamp of a boot or shoe, substantially as described, for the purpose specified.

5. The two seams *d d*, in combination with a separate piece, C, inserted in the back of a boot-leg, substantially as described, for the purpose specified.

6. In combination with an opening in the front of a boot extending from the toe to the ankle, as set forth, two or more separate lacings, 1 2 3, the lapels L L′, and the strap and buckle N N, substantially as described, for the purpose specified.

7. The heel R, composed of a number of horseshoe-shaped lifts, V, of leather, and a top lift, either with or without an interior support, substantially as herein shown and described, for the purpose specified.

8. The outside counter M of boots when formed in two or more pieces, substantially as described, for the purpose specified.

In testimony that I claim the foregoing I have hereunto set my hand this 12th day of April, 1872.

LUTHER H. FARNSWORTH.

Witnesses:
GEO. S. RAWSON,
SARAH B. RAWSON.